United States Patent
Schildmeyer et al.

(10) Patent No.: US 9,389,140 B1
(45) Date of Patent: Jul. 12, 2016

(54) SYSTEMS AND METHODS FOR TESTING OPTICAL FIBER

(71) Applicant: PHOTON KINETICS, INC., Beaverton, OR (US)

(72) Inventors: Frederic Schildmeyer, Lake Oswego, OR (US); Warren Hill, Portland, OR (US)

(73) Assignee: PHOTON KINETICS, INC., Beaverton, OR (US)

( * ) Notice: Subject to any disclaimer, the term of this patent is extended or adjusted under 35 U.S.C. 154(b) by 0 days.

(21) Appl. No.: 14/639,851

(22) Filed: Mar. 5, 2015

(51) Int. Cl.
*G01N 21/00* (2006.01)
*G01M 11/00* (2006.01)
*H04B 10/079* (2013.01)

(52) U.S. Cl.
CPC .......... *G01M 11/33* (2013.01); *H04B 10/07955* (2013.01)

(58) Field of Classification Search
CPC .............. G01M 11/33; G01M 11/88; H04Q 2011/0079; H04B 10/07955; G02B 6/2852
See application file for complete search history.

(56) References Cited

U.S. PATENT DOCUMENTS

| | | | | |
|---|---|---|---|---|
| 4,822,135 A | * | 4/1989 | Seaver ................... | G01D 5/268 250/227.14 |
| 5,347,698 A | * | 9/1994 | Kinoshita ............. | G01M 11/33 29/407.04 |
| 5,633,494 A | * | 5/1997 | Danisch ............. | G02B 6/02057 250/227.14 |
| 5,818,982 A | * | 10/1998 | Voss ................... | G01D 5/35345 385/13 |
| 2014/0050437 A1 | * | 2/2014 | Geisler .................. | G02B 6/105 385/11 |

OTHER PUBLICATIONS

IEC Standard 60793-1-20:2001, "Optical Fibres—Part 1-20: Measurement Methods and Test Procedures—Fibre Geometry," Annex B, Sep. 2001, 9 pages.

* cited by examiner

*Primary Examiner* — Michael A Lyons
*Assistant Examiner* — Maurice Smith
(74) *Attorney, Agent, or Firm* — Alleman Hall McCoy Russell & Tuttle LLP

(57) ABSTRACT

Various embodiments of an apparatus for measuring a characteristic parameter of an optical fiber are provided. In one embodiment, an apparatus for testing an optical fiber comprises: a light source enclosed within a housing and configured to couple to a first end of the optical fiber; a detector enclosed within the housing and configured to couple to a second end of the optical fiber; and a non-planar table defining a curved path, the non-planar table attached to the housing and configured to guide the optical fiber along the curved path in three dimensions. In this way, an optical fiber may be deployed for testing with minimal manual manipulation of the optical fiber.

19 Claims, 10 Drawing Sheets ized test deployment 100. The alternative configuration 150 is equivalent to the configuration 100, however the 360 degrees of the circle 115 with radius R are distributed among three curves 155, 160, and 165 with the same radius of curvature R. The alternative configuration 150 is also implemented upon a flat table, such that the optical fiber 110 remains in a two-dimensional plane. To test an optical fiber 110, the optical fiber 110 of length L is connected to the light source 105 and the detector 107 and manipulated on the flat table such that the optical fiber 110 includes the three bends. Other alternative configurations are possible and have been used by manufacturers successfully; the standard requires that any alternative bending configuration be shown to produce equivalent cutoff wavelengths and have no bends of radius smaller than the reference R=140 mm.

SYSTEMS AND METHODS FOR TESTING OPTICAL FIBER

FIELD OF INVENTION

Embodiments of the subject matter disclosed herein relate to testing optical fiber, and more particularly, to measuring a parameter of an optical fiber.

BACKGROUND

Optical fibers are used to communicate information signals from an optical driver at a proximal end of the fiber to an optical receiver at a distal end of the fiber. To that end, optical fibers comprise cylindrical waveguides. The possible solutions to Maxwell's equations in with cylindrical boundary conditions, or modes, define the propagation patterns of electromagnetic radiation, such as information signals, within an optical fiber.

In theory, the propagating modes in an optical fiber depend on the geometry of the fiber's core and the wavelength of propagation. The ratio of the radial extent of the core to the optical wavelength defines the number of modes (discrete oscillatory solutions to Maxwell's equations) that propagate in the core. As a result, performance of the fiber depends on its wavelength of operation and the geometry of the core. To control the performance of the fiber, it is important to control the core geometry, and as a quality control measure, determine the resultant performance through measurement. For fibers intended for single-mode operation, the most important quality control parameter is the cutoff wavelength of the fiber. At or above the cutoff wavelength, the optical fiber may function as a single-mode fiber, while below the cutoff wavelength, a plurality of modes may propagate in the optical fiber which functions as a multi-mode fiber decreasing the fiber's effective carrying capacity. For fibers intended for multi-mode operation, an important quality control parameter is the core diameter, which by definition includes the behavior of modes which are marginally propagating and will diminish with increasing wavelength and thus become cut off, affecting the core diameter. In practice, there are no sharp discontinuities in the behavior or the modes of an optical fiber. In other words, there is no discrete wavelength at which an optical fiber switches from one set of propagating modes to a smaller set, for example becoming a single-mode operation to a multi-mode operation fiber. Instead, the optical fiber smoothly transitions over a range of wavelengths from a greater set of modes to a smaller set. Given the importance of the cutoff wavelength and core diameter to the practical use of single-mode optical fiber, the cutoff wavelength is, by agreement, practically defined as the wavelength at which the ratio between the total power and the fundamental mode power of an optical fiber is 0.1 decibels (dB). Similarly, multi-mode fiber core diameter is defined by the radius at which the ratio of the power at that radius to the power at zero radius is 2.5%.

Furthermore, these parameters depend on the length and bends of the optical fiber. To ensure that optical fibers deployed in the real world—wherein optical fibers may vary in length and bend many times—optical fiber standards mandate a standard deployment configuration for testing optical fibers. Such tests ensure that optical fibers are consistently manufactured and meet specified parameters of the optical fiber. Example configurations of standardized test deployments are shown in FIGS. 1A and 1B. In particular, FIG. 1A shows an example configuration 100 which has been defined as the ultimate standard for measuring cutoff wavelength. An optical fiber 110 of length L, typically two meters, is connected to a tunable light source 105 and a broadband detector 107. The optical fiber 110 is manipulated into a circle 115 of radius R, typically 14 centimeters. Such an arrangement ensures that a consistent mechanical stress is imposed upon the optical fiber being tested. The entire configuration 100 is implemented upon a flat table, such that the optical fiber 110 remains in an x-y, or two-dimensional, plane. Note that minor variations in the curvature can be accepted.

FIG. 1B shows an alternative configuration 150 of the standardized test deployment 100. The alternative configuration 150 is equivalent to the configuration 100, however the 360 degrees of the circle 115 with radius R are distributed among three curves 155, 160, and 165 with the same radius of curvature R. The alternative configuration 150 is also implemented upon a flat table, such that the optical fiber 110 remains in a two-dimensional plane. To test an optical fiber 110, the optical fiber 110 of length L is connected to the light source 105 and the detector 107 and manipulated on the flat table such that the optical fiber 110 includes the three bends. Other alternative configurations are possible and have been used by manufacturers successfully; the standard requires that any alternative bending configuration be shown to produce equivalent cutoff wavelengths and have no bends of radius smaller than the reference R=140 mm.

The deployment in FIG. 1A is unusable in a practical environment, as it demands either strict control of the fiber length or the ability to change the location of either the source or the detector. While the deployment in FIB. 1B and other equivalent deployments accommodate length variation and have been in use for decades, in practice their use is vulnerable to error. For example, the manipulation of the optical fiber into the appropriate configuration by a human—or in some cases, a robotic device—may introduce small bends in the optical fiber, referred to as microbends, which impose additional mechanical stress upon the optical fiber. As a result, measurements of characteristic parameters, such as cutoff wavelength and core diameter, may be affected. In order to consistently test optical fibers, systems and methods for testing optical fibers which eliminate or substantially reduce the need for manual manipulation of the optical fiber are desirable.

Note that the discussion above is not meant to admit that any of the recognition of problems or needs or issues is known in the art. Rather, such information has been recognized by the inventors of the subject application.

BRIEF DESCRIPTION

Various embodiments of an apparatus for measuring a characteristic parameter of an optical fiber are provided. In one embodiment, an apparatus for testing an optical fiber comprises: a light source enclosed within a housing and configured to couple to a first end of the optical fiber; a detector enclosed within the housing and configured to couple to a second end of the optical fiber; and a non-planar table defining a curved path, the non-planar table attached to the housing and configured to guide the optical fiber along the curved path in three dimensions. In this way, an optical fiber may be deployed for testing with minimal manual manipulation of the optical fiber and easily accommodating the required range of sample length.

In another embodiment, a method of testing an optical fiber comprises: commanding a light source to emit a photon beam spanning a range of wavelengths into the optical fiber, the optical fiber positioned in three-dimensions with at least three bends of equal radius; receiving, from a sensor coupled to the optical fiber, a radiation output of the optical fiber; calculating a characteristic parameter of the optical fiber based on the radiation output of the optical fiber; and displaying the calculated characteristic parameter via a display. In this way, characteristic parameters, such as cutoff wavelength and core diameter, of an optical fiber may be accurately and consistently measured.

In yet another embodiment, a system comprises: a measurement instrument enclosed within a housing, the measurement instrument comprising a light source and a detector; a non-planar table defining a curved path, the non-planar table attached to the housing; and a computing device comprising a processor and a non-transitory memory, the computing device configured with instructions in the non-transitory memory that when executed cause the processor to calculate a characteristic parameter of an optical fiber coupled to the measurement instrument and laid upon the non-planar table. In this way, gravity may arrange the optical fiber into a desired configuration for testing.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

FIB. 1B shows a block diagram illustrating an alternative configuration for measuring a characteristic parameter of an optical fiber.

Figure 2:
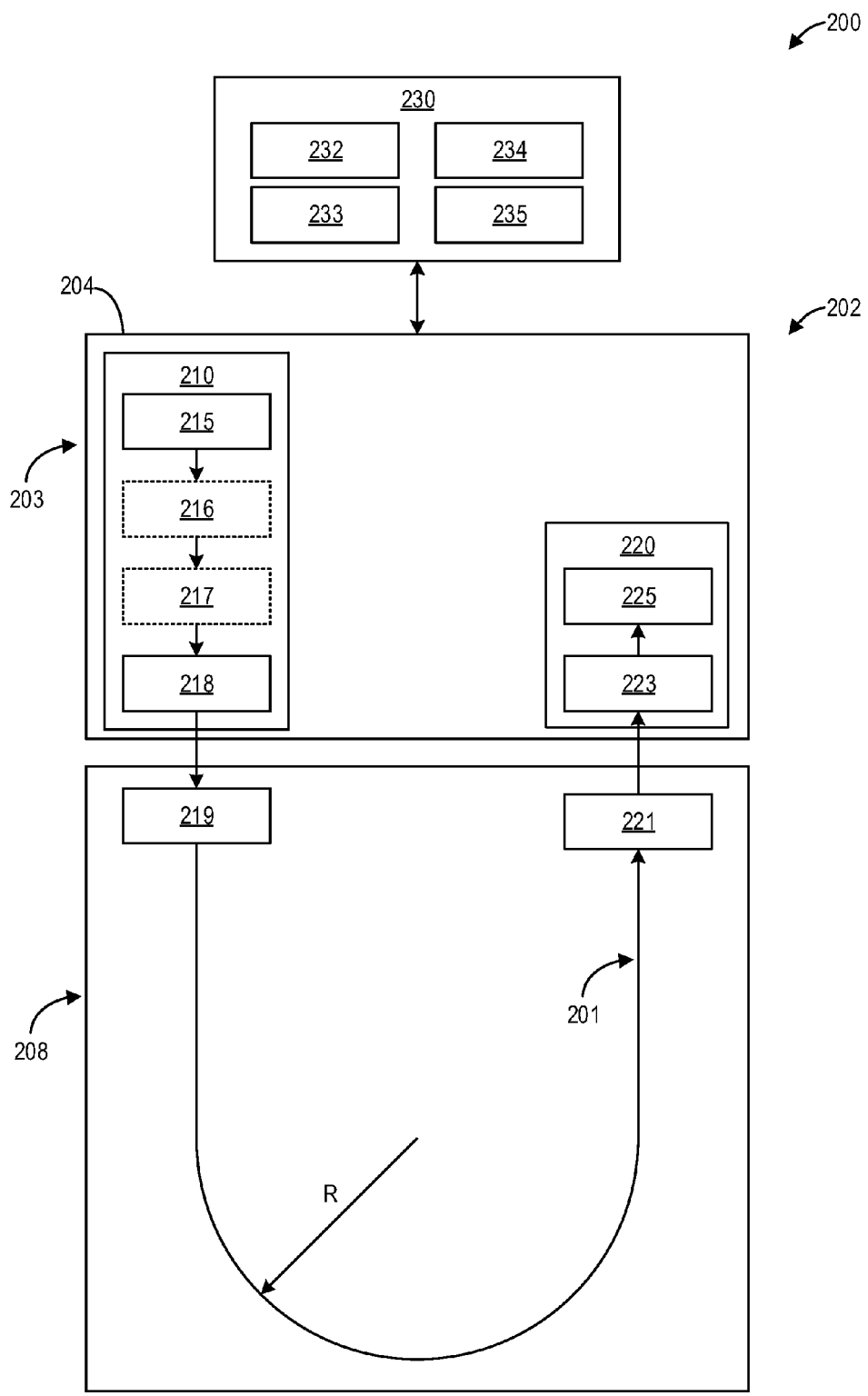

FIG. 2 shows a block diagram illustrating an apparatus for measuring a characteristic parameter of an optical fiber according to an embodiment.

Figure 3:
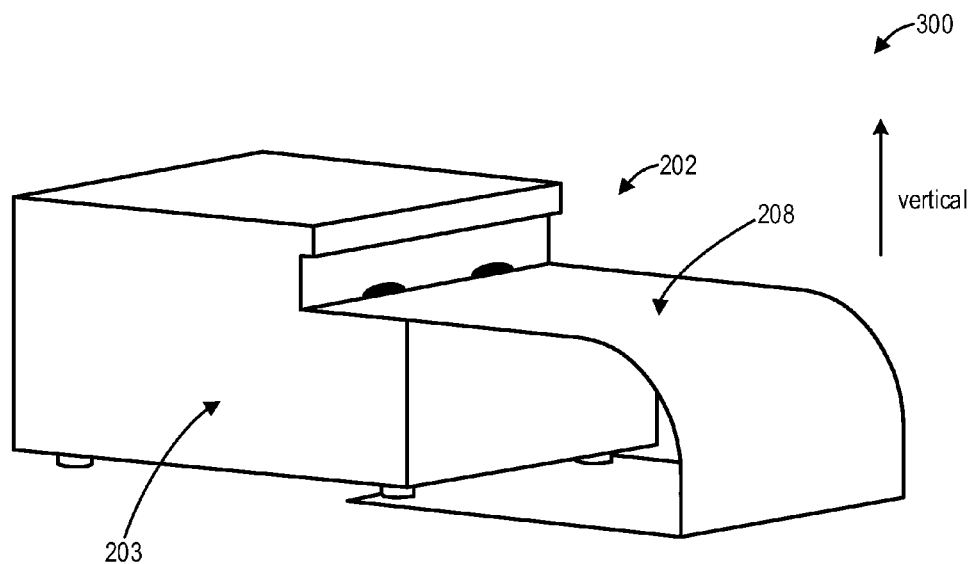

FIG. 3 shows a perspective view of an apparatus for measuring a characteristic parameter according to an embodiment.

Figure 4:
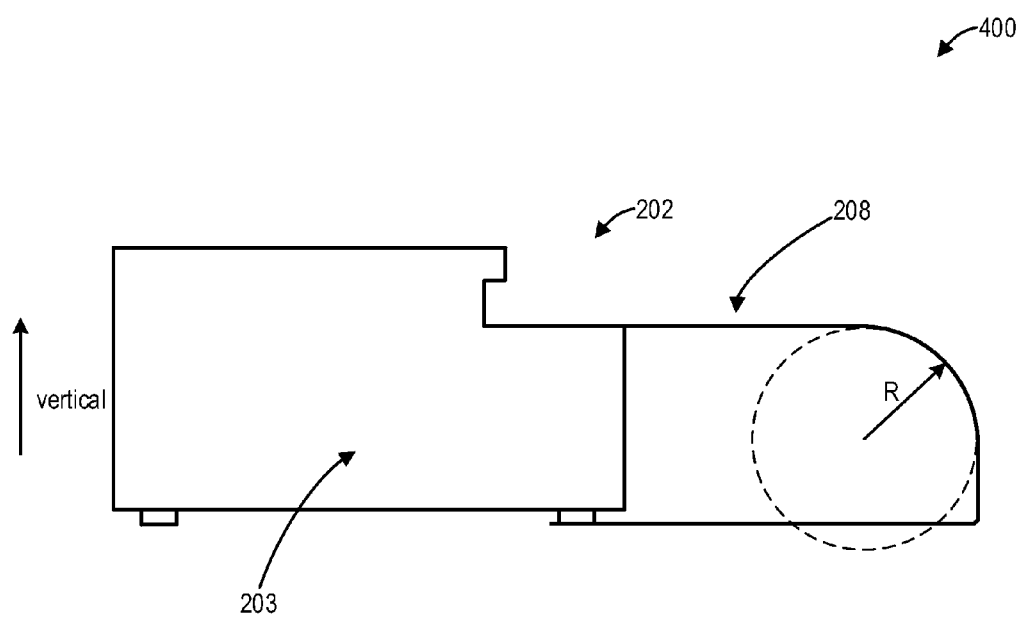

FIG. 4 shows a side view of an apparatus for measuring a characteristic parameter according to an embodiment.

Figure 5:
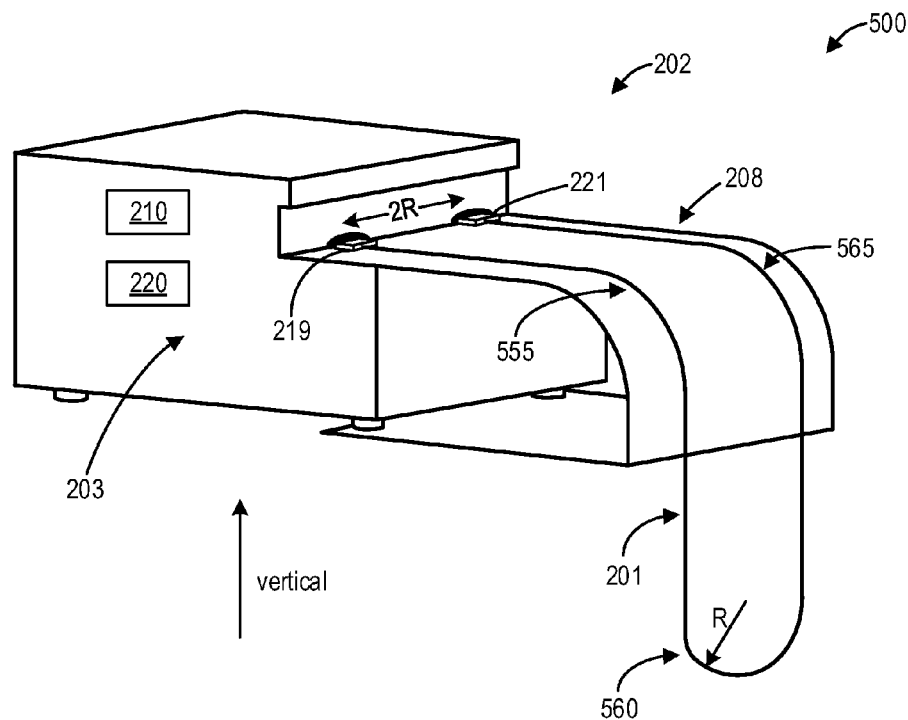

FIG. 5 shows a perspective view of an apparatus for measuring a characteristic parameter of an optical fiber according to an embodiment.

Figure 6:
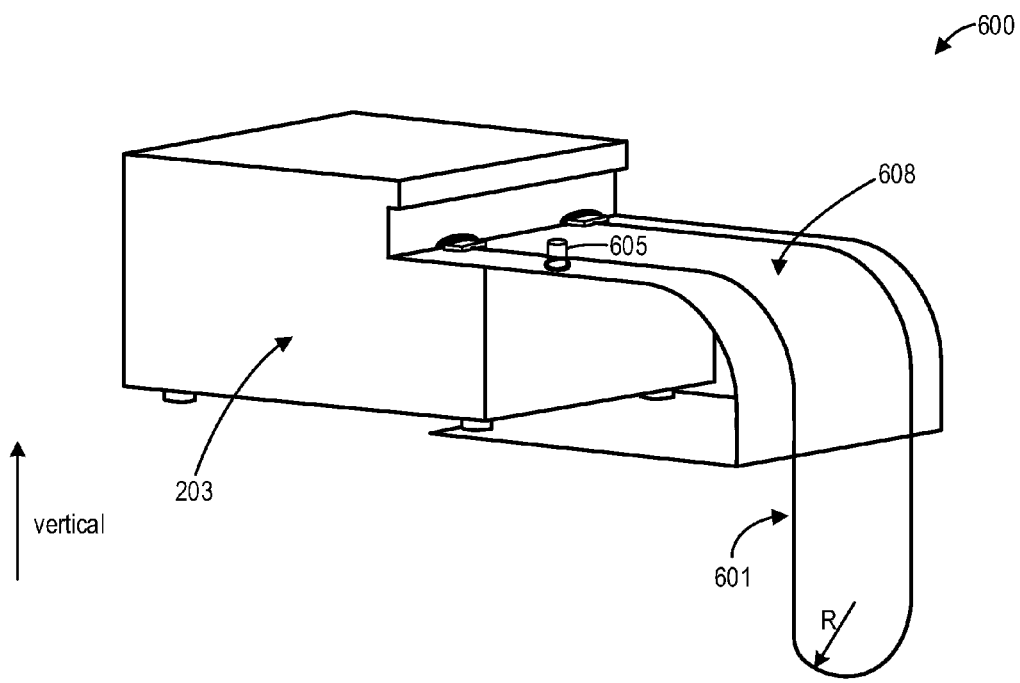

FIG. 6 shows a perspective view of an apparatus including a post for measuring a characteristic parameter of an optical fiber according to an embodiment.

Figure 7:
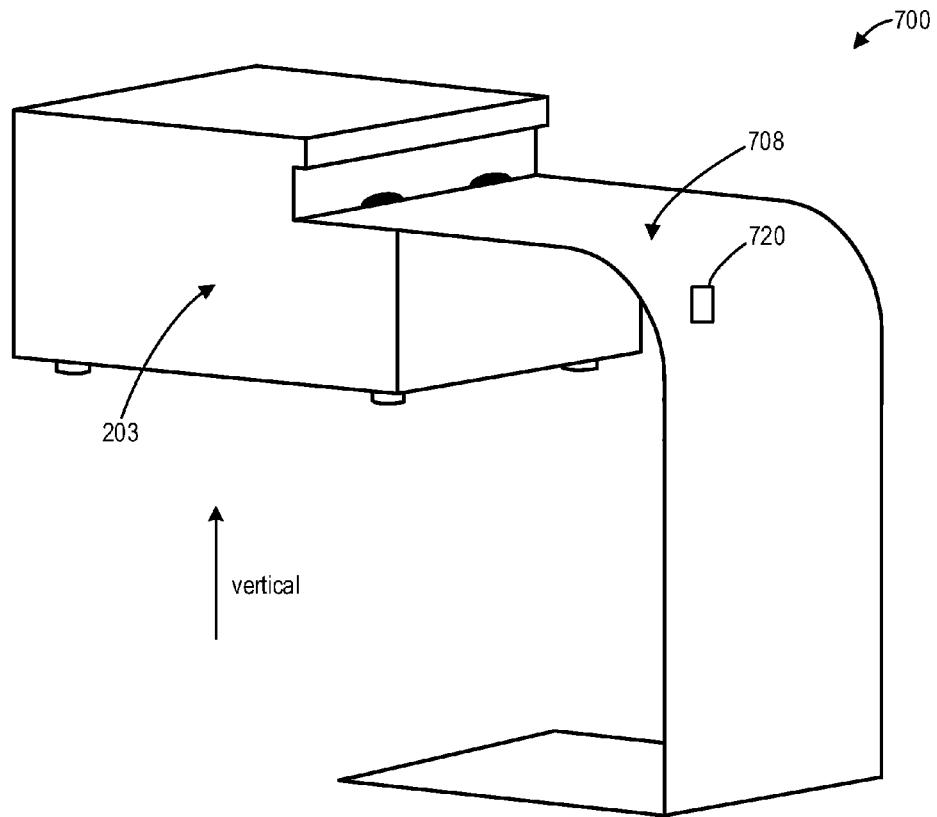

FIG. 7 shows a perspective view of an apparatus including an extended non-planar fiber table for measuring a characteristic parameter according to an embodiment.

Figure 8:
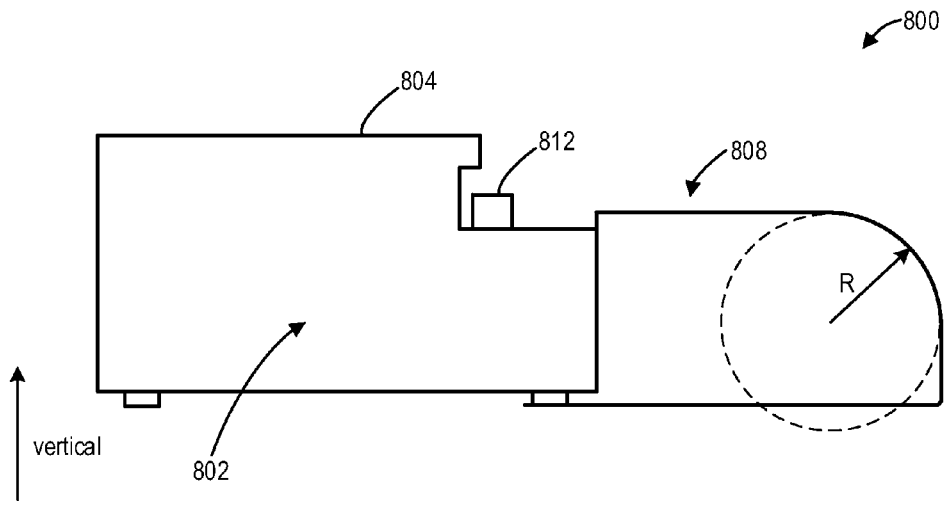

FIG. 8 shows a side view of an apparatus for measuring a characteristic parameter according to an embodiment.

Figure 9:
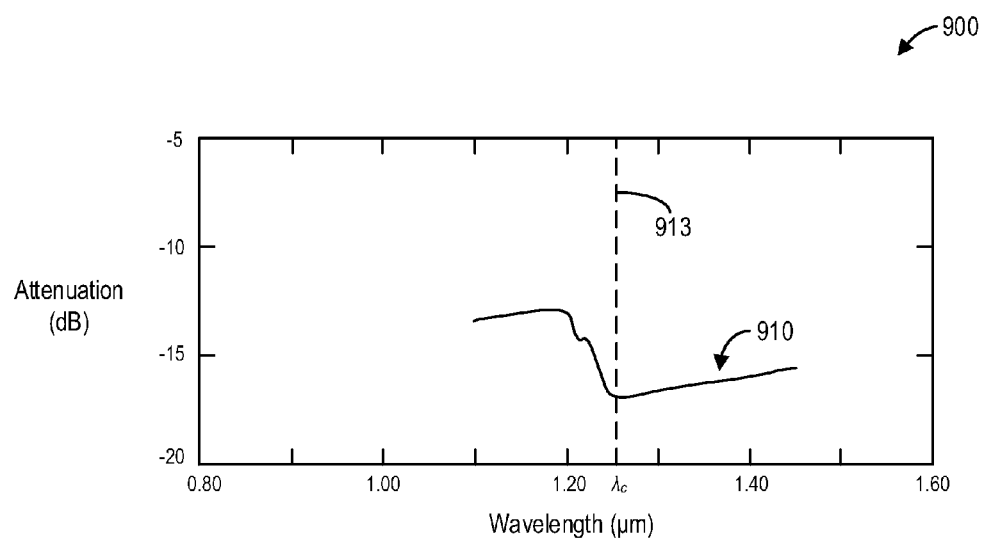

FIG. 9 shows a graph illustrating an example measurement of a cutoff wavelength according to an embodiment.

Figure 10:
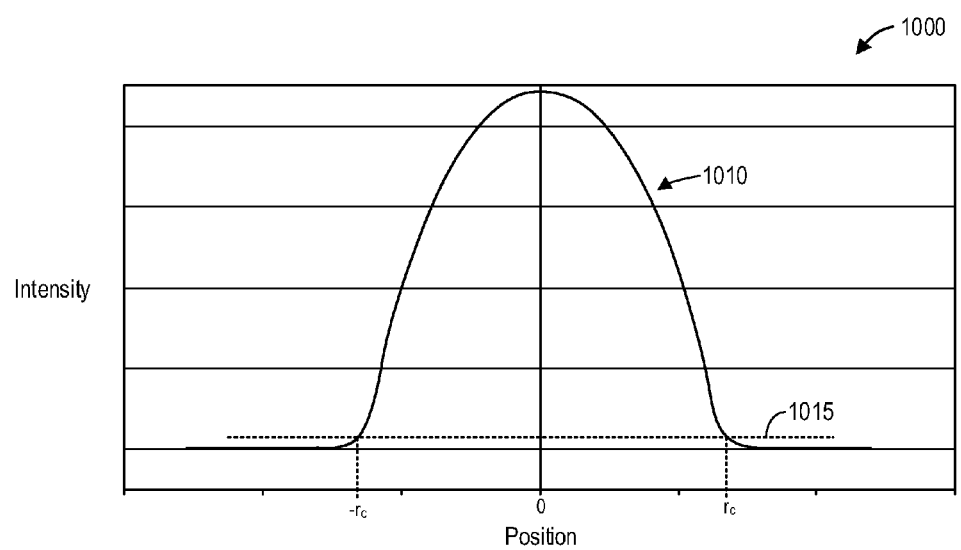

FIG. 10 shows a graph illustrating an example measurement of a core diameter according to an embodiment.

Figure 11:
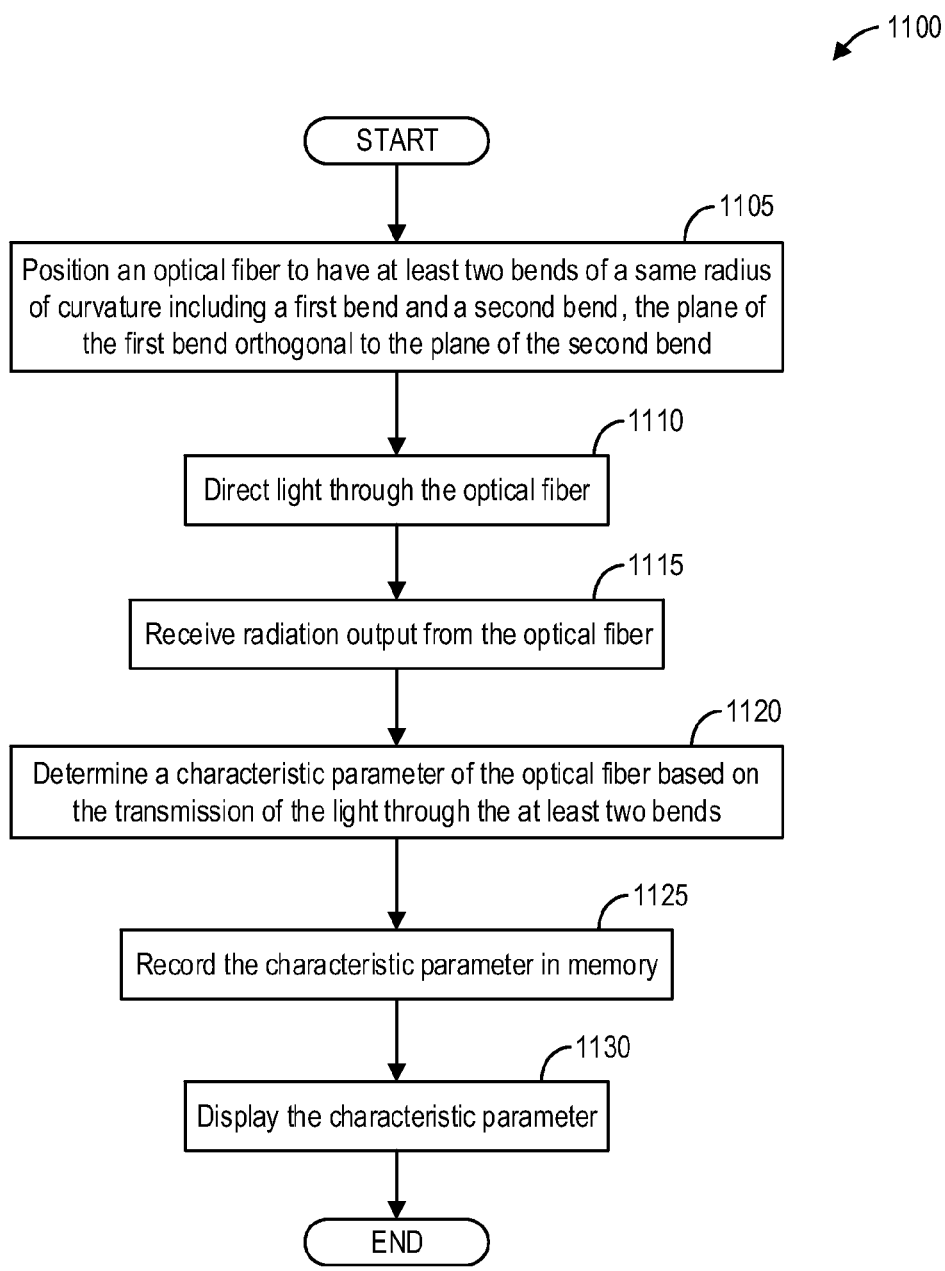

FIG. 11 shows a high-level flow chart illustrating an example method for measuring a characteristic parameter of an optical fiber according to an embodiment.

Figure 12:
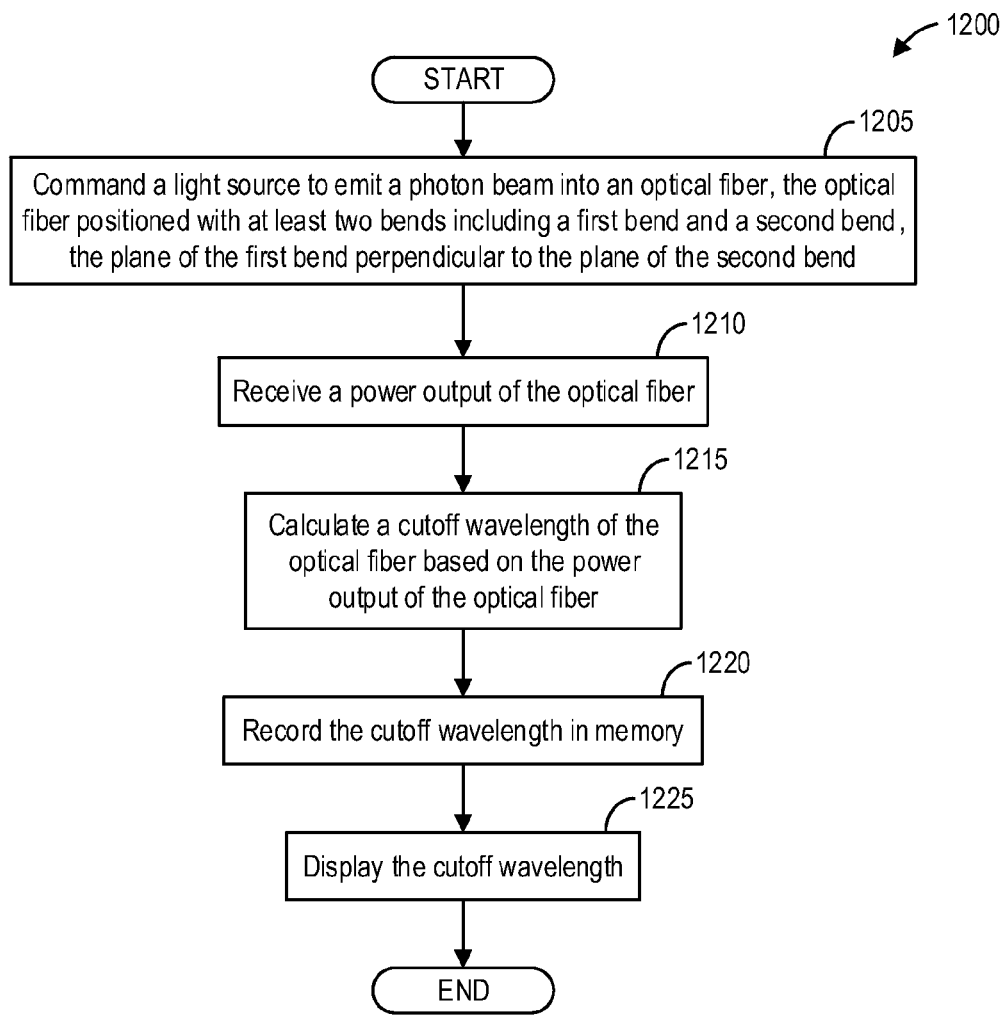

FIG. 12 shows a high-level flow chart illustrating an example method for measuring a cutoff wavelength of an optical fiber according to an embodiment.

Figure 13:
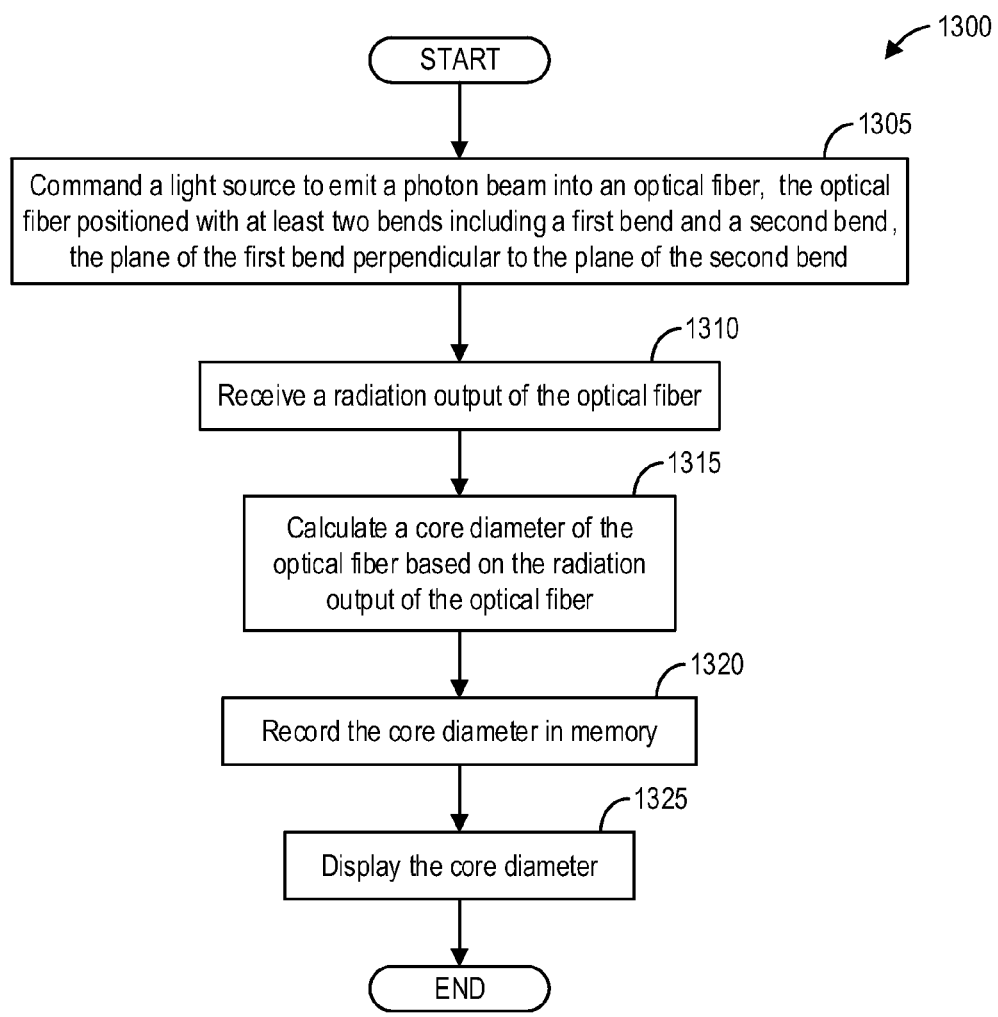

FIG. 13 shows a high-level flow chart illustrating an example method for measuring a core diameter of an optical fiber according to an embodiment.

DETAILED DESCRIPTION

The following description relates to various embodiments of a new deployment for testing an optical fiber including a non-planar fiber deployment. Example methods and systems are provided for measuring a characteristic parameter of an optical fiber with the deployment. The non-planar deployment may include positioning of the optical fiber utilizing gravity to form one or more of the bends or radii. The non-planar deployment may including a structure that is contiguous with one or more portions of the fiber and dis-contiguous with one or more portions of the fiber where the gravity-induced bend is located. The non-planar deployment may include a structural surface forming bends or radii in different, perpendicular, planes with respect to each other.

The deployment may be implemented via a system for measuring a characteristic parameter, such as cutoff wavelength or core diameter, such as the system depicted in FIG. 2. The system may comprise an optical fiber measurement instrument and a non-planar table. The non-planar table may be curved such that an optical fiber laid upon the non-planar table conforms to the table with three circular bends of equal radius, as depicted in FIGS. 3 through 5. In some embodiments, the non-planar table may include additional structures to enable additional bends in the optical fiber, such as depicted in FIG. 6. The non-planar table may extend vertically downwards towards a floor, as depicted in FIG. 7, thereby providing additional guidance to an optical fiber. In some examples, a horizontal segment of the non-planar table may not be flush with the optical fiber measurement instrument, which may include additional components for coupling to an optical fiber, as depicted in FIG. 8. The optical fiber measurement instrument may be configured to determine a cutoff wavelength from the power output of an optical fiber as a function of wavelength, as shown by the graph in FIG. 9, and may additionally or alternatively be configured to determine a core diameter from the power output of an optical fiber as a function of position, as shown by the graph in FIG. 10. Finally, methods for measuring characteristic parameters of an optical fiber, such as cutoff wavelength and core diameter, are shown in FIGS. 11-13.

Though the methods and systems disclosed herein are described with regard to the measurement of a cutoff wavelength in one example and core diameter in another example, a person skilled in the art will readily appreciate that the methods and systems described herein may be applied to the measurement of optical fiber parameters other than and/or in addition to cutoff wavelength or core diameter without departing from the scope and spirit of the disclosure. For example, the methods and systems herein may be advantageously applied to the measurement of a plurality of geometric and/or transmission parameters of optical fibers. As a non-limiting example, in some embodiments of the methods and systems described herein, polarization mode dispersion may be measured through interferometry. Further, while a characteristic parameter for each of single-mode and multi-mode optical fibers is described, it should be appreciated that geometric and/or transmission parameters of optical fibers other than those described may be measured in accordance with the methods and systems described herein.

Turning now to the figures, FIG. 2 shows a block diagram illustrating a system 200 for measuring a cutoff wavelength of an optical fiber 201 according to an embodiment of the invention. System 200 may include, for example, an apparatus 202 coupled to a computing device 230. The apparatus 202 may comprise an optical fiber measurement instrument 203 and a non-planar table 208 attached thereto. An optical fiber 201 may be laid upon the non-planar table 208 and connected to the measurement instrument 203. As described further herein, the optical fiber 201 may conform to the surface of non-planar table 208 and therefore the optical fiber 201 will include multiple bends with a consistent radius of curvature. The measurement instrument includes a source 210 and a detector 220. Light generated by the source 210 may be directed into one end of the optical fiber 201 and received at the other end of the optical fiber 201 by the detector 220. In this way, characteristic parameters detailing transmissive and geometric properties of an optical fiber 201 may be easily measured with system 200.

As briefly described herein above, the apparatus 202 includes an optical fiber measurement instrument 203. The optical fiber measurement instrument 203 comprises a housing 204 which is mounted on a support structure (not shown), such as a table, and contains a tunable broadband source 210 and a broadband detector 220. Tunable broadband source 210 may include a light source 215. Furthermore, tunable broadband source 210 may optionally include, as non-limiting examples, an optical chopper 216 and a monochromator 217. Tunable broadband source 210 may further include launch optics, such as lens 218. Broadband detector 220 may include receive optics, such as lens 223, and a light sensor 225. In one non-limiting example, the light sensor 225 may comprise a spatially-integrating power law light detector. Such a spatially-integrating detector may enable the measurement of, say, a cutoff wavelength of an optical fiber. In another non-limiting example, the light sensor 225 may comprise a spatially-resolved power law light detector, including but not limited to a video camera, a mechanically-scanned pinhole detector, and so on. Such a spatially-resolved detector may enable the measurement of, say, a core diameter of a multi-mode optical fiber. In yet another non-limiting example, the light sensor 225 may comprise one or more of a spatially-integrating detector and a spatially-resolved detector, and receive optics 223 may include optical and/or electrical components configured to direct light transmitted through optical fiber 201 to either the spatially-integrating detector, the spatially-resolved detector, or combinations thereof based on a parameter being measured. In this way, the apparatus 202 may measure a plurality of characteristic parameters, including but not limited to cutoff wavelength, core diameter, cladding diameter, and so on of a plurality of optical fibers, including but not limited to single-mode optical fibers, multi-mode optical fibers, and so on.

Optical fiber 201 may be connected to the optical fiber measurement instrument 203 for measuring properties of the optical fiber 201. In particular, one end of optical fiber 201 may be operably connected to the tunable broadband source 210 via fiber connector 219, while the other end of optical fiber 201 may be operably connected to the broadband detector 220 via fiber connector 221. To perform a test on the optical fiber 201, the broadband source 210 may be activated such that a broadband photon beam comprising photons with a range of wavelengths is emitted into the optical fiber 201. The photon beam excites the modes of the optical fiber 201. The radiation output received by the broadband detector 220 may be measured and used to calculate characteristic parameters of the optical fiber. For example, the cutoff wavelength of the optical fiber 201 comprises the wavelength at which the ratio of the total power output to the fundamental mode power decreases below a threshold. In one example, the threshold may comprise 0.1 decibels, while in other examples, the threshold may be greater than or less than 0.1 decibels. Thus, the cutoff wavelength may be calculated based on the radiation output, in particular the power output, received by the broadband detector 220. As another example, the core diameter of the optical fiber 201 comprises the radius at which the ratio of the power at that radius to the power at zero radius is equal to a threshold percentage. In one example, the threshold percentage may comprise 2.5%, while in other examples the threshold percentage may be greater than or less than 2.5%. Thus, the core diameter may be calculated based on the power output received by the broadband detector 220.

Optical fiber 201 may be laid upon a non-planar table 208 during testing. The non-planar table 208 may be curved downwards such that the optical fiber 201 conforms under gravity into the appropriate shape depicted by configuration 150 in FIG. 1B. The curvature of the non-planar table 208 enables the configuration 150 to be achieved with minimal manipulation of the optical fiber 201.

Note that FIG. 2 is schematic in nature and is a view from above of the system 200, and therefore does not necessarily indicate the non-planar nature of the positional configuration of the various components with respect to one another.

To illustrate the curvature of non-planar table 208, FIG. 3 shows a perspective view 300 of the apparatus 202, with vertical marked by an arrow (where vertical is with respect to gravity, and horizontal being perpendicular to vertical). In particular, perspective view 300 illustrates how the non-planar table 208 may be connected to the measurement instrument 203. FIG. 4 shows a side view 400 of the apparatus 202. Side view 400 illustrates how the non-planar table 208 comprises a table with a radius of curvature equal to R.

In particular, as depicted in FIGS. 3 and 4, at least a portion of non-planar table 208 lies in the horizontal plane and at least a portion of non-planar table 208 lies in the vertical plane, and the two perpendicular portions of the non-planar table 208 (i.e., the horizontal portion and the vertical portion) are connected by a curved (e.g., cylindrical) portion of the non-planar table 208, where the curved portion includes a radius of curvature R. The horizontal, curved, and vertical portions are continuously (i.e., smoothly) connected to one another to form the non-planar table 208.

To that end, non-planar table 208 may be formed as a single piece of material, such as sheet metal. The single piece of sheet metal comprising non-planar table 208 may comprise a suitable metal, including but not limited to steel, aluminum, titanium, and so on. In some examples, the single piece of material may comprise a non-metal material, such as a plastic. Furthermore, in some examples, a coating may be applied to the material to form a substrate. When included, the coating may be selected to provide desired adhesive and/or non-adhesive properties, electrical properties, protective properties, and so on. For example, the coating may be selected to provide the surface of non-planar table 208 with a desired coefficient of friction, such that, as an example, an optical fiber placed upon the non-planar table 208 may stay in place. As another example, the coating may comprise an insulating (e.g., non-conductive) coating to reduce ambient electrostatic effects on the optical fiber during testing.

Figure 1A:
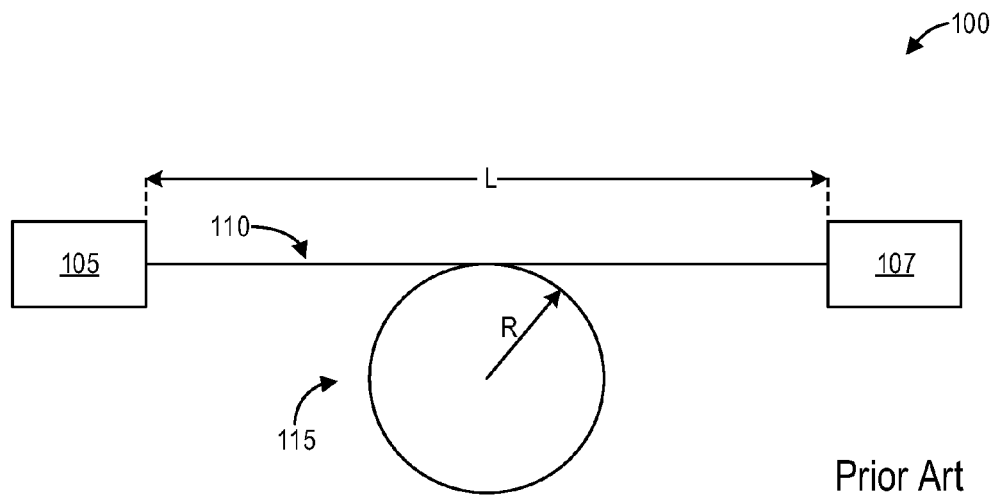
FIG. 1A shows a block diagram illustrating the reference configuration for measuring a characteristic parameter of an optical fiber.
Figure 1B:
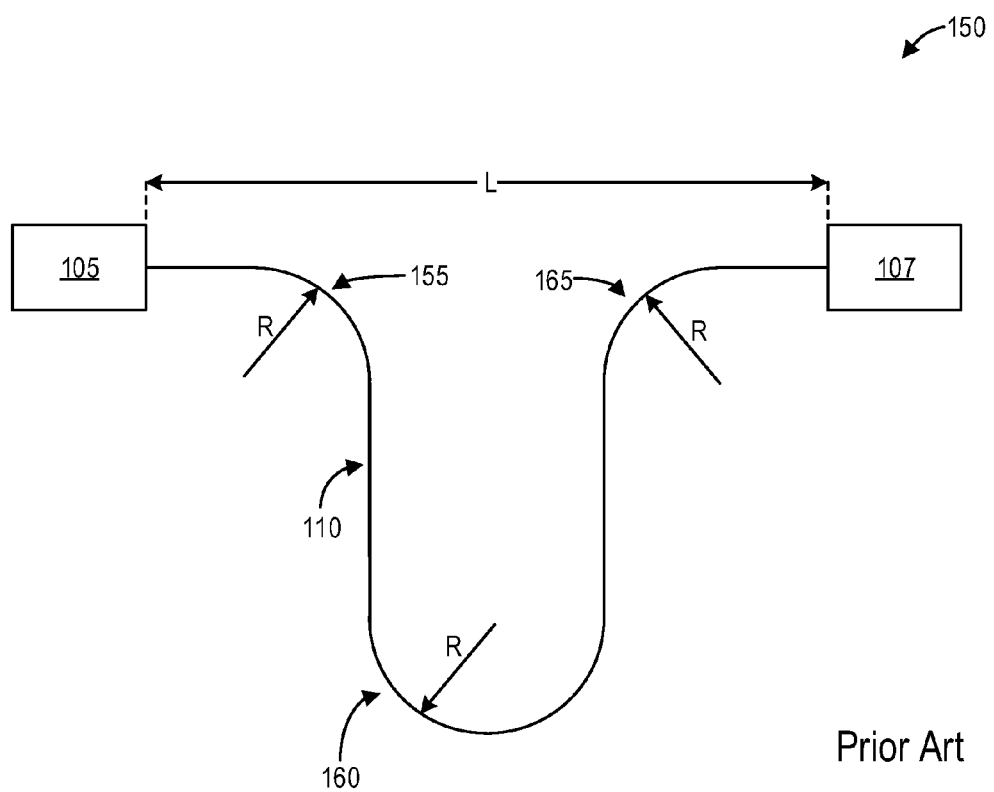

To illustrate how non-planar table 208 guides an optical fiber such as optical fiber 201 into the configuration 150 depicted in FIG. 1B, FIG. 5 shows a perspective view 500 of the apparatus 202 with an optical fiber 201 connected to the measurement instrument 203 and laid upon the non-planar table 208. The optical fiber 201 conforms to the non-planar fiber table 208, thereby producing two bends of radius R along the portions of the optical fiber 201 that lie upon the non-planar fiber table 208. In particular, the optical fiber includes a macrobend 555 and a macrobend 565, both macrobends comprising 90 degree turns of equal radius R of the optical fiber 201. As depicted, the plane of the macrobend 555 may be parallel to the plane of the macrobend 565, and the two planes may be separated by a distance 2R. In this way, the optical fiber 201 includes two 90 degree turns with radius R, each turn from the horizontal plane to the vertical plane. The optical fiber 201 may extend beyond the non-planar fiber table 208 and hang suspended in free space under gravity. As depicted, the lowest portion of the optical fiber 201 may naturally form a bend of radius R since the connection points 219 and 221 are separated by twice R. In this way, the optical fiber 201 includes a catenary macrobend 560 comprising a 180 degree turn with radius R of the optical fiber 201, the turn occurring entirely in the vertical plane. Thus, an optical fiber 201 connected to the front-loading optical fiber measurement instrument 203 and laid upon the non-planar table 208 may comprise three bends of radius R compromising one full turn of 360 degrees (i.e., the two 90 degree turns plus the 180 degree turn) as mandated by the standardized configuration 150. It should be noted that positioning an optical fiber 201 as depicted in FIG. 5 may be performed by front-loading the optical fiber 201 to the measurement instrument 203 such that the optical fiber 201 lays upon the non-planar table 208, and each of the macrobends 555, 560, and 565 occur without additional manipulation by an operator (e.g., human, robotic device, and so on).

When an optical fiber 201 is coupled to the measurement instrument 203 as depicted in FIG. 5, one end of the optical fiber 201 may be coupled to the measurement instrument 203 via fiber connector 219 while the other end of the optical fiber 201 may be coupled to the measurement instrument 203 via fiber connector 221. Further, the end of the optical fiber 201 connected via fiber connector 219 may be coupled to the broadband source 210, while the end of the optical fiber 201 connected via fiber connector 221 may be coupled to the broadband detector 220. In this way, the broadband source 210 may direct light into the optical fiber 201, which transmits and outputs the light to the broadband detector 220.

Returning to FIG. 2, the non-planar table 208 enables the front-loading configuration of the measurement instrument 203 which heretofore was unfeasible given the deployment configurations 100 and 150 depicted in FIGS. 1A and 1B and described hereinabove. The front-loading configuration enables the size of a measurement instrument 203, and in turn the full apparatus 202 to be substantially reduced in comparison to a typical optical fiber testing apparatus.

As a result of the curvature of non-planar table 208 and the front-loading configuration of the optical fiber measurement instrument 203, testing throughput may be increased. Furthermore, minimal manipulation of the optical fiber 201 enabled by the non-planar table 208 may eliminate additional mechanical stress added to the optical fiber 201 during the setup, thereby improving a measurement of the cutoff wavelength.

Yet another beneficial result of the non-planar table 208 is the ability to vary the length of the optical fiber under test. The design and structure of a typical optical fiber testing apparatus may limit the length of an optical fiber that may be tested in accordance with the deployment configuration illustrated in FIGS. 1A and 1B. For example, the length of an optical fiber tested with a typical testing apparatus may be limited to two meters without reconfiguring the apparatus. In contrast, the apparatus 202 may easily test an optical fiber of varying length with no additional setup. For example, a three-meter length of optical fiber front-loaded to the measurement instrument 203 and laid upon the non-planar table 208 will produce the same three bends with the same radius of curvature R as a two-meter length of optical fiber, a one-meter length of optical fiber, and so on without reconfiguring the non-planar table 208.

In one example, the fiber connectors 219 and 221 may be front-loaded to the optical fiber measurement instrument 203 a distance 2R apart from one another such that the bend in the optical fiber 201 depicted in FIG. 2 (i.e., the 180 degree bend) comprises a radius of curvature equal to R, corresponding to the second bend 160 shown in FIG. 1B. In some examples, the distance between the fiber connectors 219 and 221 may be less than or greater than 2R while the radius of curvature of optical fiber 201 remains R.

In some examples, optical fiber measurement instrument 203 may be communicatively coupled to a computing device 230. Computing device 230 may include a processor 232 configured to execute instructions stored in non-transitory memory 233. For example, the computing device 230 may be configured to automatically control the optical fiber measurement instrument 203 in order to measure a characteristic parameter of an optical fiber. Such a characteristic parameter may comprise a geometric and/or transmissive parameter of the optical fiber, including but not limited to cutoff wavelength, core diameter, cladding diameter, and so on. As a non-limiting example, the computing device 230 may be configured to automatically control the optical fiber measurement instrument 203 in order to, say, measure a cutoff wavelength of an optical fiber. Example methods for measuring a characteristic parameter, including but not limited to cutoff wavelength and core diameter, which may be stored as executable instructions in non-transitory memory 233 and executed by processor 232 are described further herein and with regard to FIGS. 11-13.

Computing device 230 may further comprise a display 234 configured to display graphical and/or textual information regarding the optical fiber measurement instrument 203, including but not limited to test results and measurement instrument settings. Computing device 230 may further include a user interface 235 enabling a user of apparatus 202 to operate the apparatus 202. To that end, user interface 235 may include, as non-limiting examples, a keyboard, mouse, touchscreen, joystick, camera, microphone, and so on.

In some embodiments, additional bends in an optical fiber may be desired for testing. As an example, FIG. 6 shows a perspective view of an apparatus 600 including a post 605 for measuring a cutoff wavelength of an optical fiber 601. The post 605 may be mounted on the non-planar table 608 such that an optical fiber 601 coupled to the optical fiber measurement instrument 203 and laid upon the non-planar table 608 may be wrapped around the post 605, thereby providing additional bends in the optical fiber 601.

In other embodiments, additional guidance for the optical fiber may be desired. As an example, FIG. 7 shows a perspective view of an apparatus 700 including an extended non-planar table 708 for measuring a cutoff wavelength according to an embodiment of the invention. The extended non-planar table 708 may be coupled to the optical fiber measurement instrument 203, which may be mounted on a flat bench (not shown). The extended non-planar table 708 may extend vertically towards the floor on which the flat bench is placed. The extended non-planar table 708 may include the curvature of radius R as described hereinabove with regard to FIG. 4. The vertical segment of the extended non-planar table 708 may provide additional support and guidance for an optical fiber laid upon the extended non-planar 708. For example, a user of the apparatus 700 may be able to visually determine that an optical fiber is hanging in the vertical direction without any horizontal displacement, that is, the user may confirm that the optical fiber is flush with the extended non-planar table 708 along the entire length of the extended non-planar table 708.

In some embodiments, visual markings, such as 720, may be positioned on an outer surface of the table 708 to assist in aligning the cable during measurements. The visual indicator may be a line or other marking to assist in confirming alignment or with initial alignments.

In another embodiment, the non-planar table may not be flush with the optical fiber measurement instrument as depicted in FIGS. 3-7. As an example, FIG. 8 shows a side view of an apparatus 800 for measuring a cutoff wavelength according to an embodiment of the invention. The apparatus 800 includes an optical fiber measurement instrument 802, which may be identical in function to the optical fiber measurement instrument 202 described herein above. However, the housing 804 of the optical fiber measurement instrument 802 may not perfectly line up with the horizontal segment of the non-planar table 808, which may be identical or substantially similar in shape and size to the non-planar table 208. Such a clearance between the housing 804 and the non-planar table 808 may enable an optical fiber to be coupled to the optical fiber measurement instrument 802 via, for example, fiber connectors 219 and 221, without deflecting in the vertical direction when coupling to the optical fiber measurement instrument 802. Furthermore, the optical fiber measurement instrument 802 may include one or more components 812, such as a guide, to simplify connection of the optical fiber to the optical fiber measurement instrument 802.

Note that while the broadband source 210 and the broadband detector 220 are explicitly shown in FIGS. 2 and 5, the broadband source 210 and the broadband detector 220 (including the respective constituent components depicted in FIG. 2) should be understood as included in the measurement instrument 203 depicted in FIGS. 3, 4, 6-7 in addition to the measurement instrument 802 depicted in FIG. 8.

FIG. 9 shows a graph 900 illustrating an example measurement of a cutoff wavelength according to an embodiment of the invention. In particular, graph 900 includes a plot 910 of attenuation in an optical fiber as a function of wavelength measured by the system 200 described herein above with regard to FIG. 2. The measured cutoff wavelength 913 confirms that the non-planar deployment as described herein is compliant with mandated standards.

Similarly, FIG. 10 shows a graph 1000 illustrating an example measurement of a core diameter according to an embodiment of the invention. In particular, graph 1000 includes a plot 1010 of intensity transmitted in an optical fiber as a function of position within the optical fiber as measured by the system 200 described herein above with regard to FIG. 2. The peak intensity is associated with the center of the optical fiber (i.e., position 0), and the core radius is defined as the radius at which the ratio of the intensity at that radius to the intensity at zero radius is 2.5%. The core diameter then equals twice the core radius. Referring to the Figure, the ratio of the intensity indicated by dashed line 1015 to the intensity at zero radius is 2.5%. Therefore the positions of the intersections of plot 1010 with dashed line 1015 comprise the core radius labeled $r_c$. In this way, the core diameter may be calculated from the intensity measured as a function of position.

FIG. 11 shows a high-level flow chart illustrating an example method 1100 for testing an optical fiber according to an embodiment of the present disclosure. In particular, method 1100 relates to the calculation of a characteristic parameter of an optical parameter, wherein the optical fiber is positioned in three spatial dimensions. Specifically, the optical fiber may be positioned, for example, as depicted in FIG. 5 such that the optical fiber includes three macrobends of equal radius R. In some examples, the optical fiber may include more or less than three macrobends of equal radius R. In such examples, the optical fiber may include at least two macrobends of equal radius, including a first bend and a second bend, where the plane of the first bend is orthogonal to the plane of the second bend. Method 1100 may be carried out using the components and systems depicted in FIG. 2, however it should be understood that the method may be applied to other components and systems without departing from the scope of the present disclosure. As a non-limiting example, method 1100 may be stored as executable instructions in the non-transitory memory 233 and may be executed by the processor 232 of the computing device 230.

Method 1100 may begin at 1105. At 1105, method 1100 may include positioning an optical fiber to have at least two bends of a same radius of curvature including a first bend and a second bend. The plane of the first bend is orthogonal to the plane of the second bend. For example, with regard to the system of FIG. 2, the optical fiber 201 may be placed upon a non-planar table 208 and coupled to a measurement instrument 203 via a pair of fiber connects 219 and 221 attached to the ends of the optical fiber 201. Placing the optical fiber 201 upon the non-planar table 208 automatically produces three macrobends of equal radius R as depicted in FIG. 5, where the plane of the first macrobend 555 is orthogonal to the plane of the second macrobend 560. Further, the plane of the third macrobend 565 is orthogonal to the plane of the second macrobend 560 and parallel to the plane of the first macrobend 555. The first macrobend 555 and the third macrobend 565 comprise 90 degree turns of the optical fiber 201, while the second macrobend 560 comprises a 180 degree turn of the optical fiber 201. In this way, the optical fiber may be easily deployed for testing in accordance with established standards with minimal handling of the optical fiber, thereby reducing a number of microbends of the optical fiber which may otherwise be introduced by touching the optical fiber. In some examples, additional macrobends in the optical fiber may be introduced by wrapping the optical fiber around, as a non-limiting example, a post such as post 605 in FIG. 6.

After positioning the optical fiber to have at least two bends, method 1100 may continue to 1110. At 1110, method 1100 may include directing light through the optical fiber. For example, light may be generated by a light source 210 and directed into the optical fiber 201.

Continuing at 1115, method 1100 may include receiving radiation output from the optical fiber. For example, the light directed into the optical fiber 201 at 1110 may be transmitted through the optical fiber 201 and output into the broadband detector 220. The detector 220 may thus receive the radiation output. In one example, detector 220 may include a spatially-integrating light detector 225. In another example, detector 220 may include a spatially-resolving light detector 225. In yet another example, detector 220 may include one or more of a spatially-integrating light detector, a spatially-resolving light detector, combinations thereof, and so on. In such an example, detector 220 may include receive optics 223 configured to direct radiation output from the optical fiber 201 towards a spatially-integrating light detector, a spatially-resolved light detector, combinations thereof, and so on.

After receiving the radiation output, method 1100 may continue to 1120. At 1120, method 1100 may include determining a characteristic parameter of the optical fiber based on the transmission of the light through the at least two bends. For example, output of the optical fiber received by the detector 220 at 1115 may be used to calculate or estimate a characteristic parameter of the optical fiber. As a non-limiting and illustrative example, power output of the optical fiber detected by a spatially-integrating detector 225 may be used to calculate a cutoff wavelength of the optical fiber 201. As another non-limiting and illustrative example, intensity of transmitted light output from the optical fiber and detected by a spatially-resolved detector 225 may be used to determine a core diameter of the optical fiber 201.

At 1125, method 1100 may include recording the characteristic parameter in memory, such as memory 233. At 1130, method 1100 may include displaying the characteristic parameter, for example via display 234. Method 1100 may then end.

FIG. 12 shows a high-level flow chart illustrating an example method 1200 for testing an optical fiber according to an embodiment of the disclosure. In particular, method 1200 relates to the calculation of a cutoff wavelength of an optical fiber, wherein the optical fiber is positioned in three spatial dimensions. Specifically, the optical fiber may be positioned, for example, as depicted in FIG. 5 such that the optical fiber includes three macrobends of equal radius R. Method 1200 may be carried out by the systems and components depicted in FIG. 2, however the method may be applied to other systems and components without departing from the scope of the present disclosure. As a non-limiting example, method 1200 may be stored as executable instructions in the non-transitory memory 233 and may be executed by the processor 232 of the computing device 230.

Method 1200 may begin at 1205. At 1205, method 1200 may include commanding a light source to emit a photon beam into an optical fiber. The light source may comprise a broadband light source 210, and so the photon beam may comprise photons spanning a range of wavelengths. The optical fiber may be configured with at least two bends (i.e., macrobends), including a first bend and a second bend. The plane of the first bend is orthogonal to the plane of the second bend. For example, with regard to the system of FIG. 2, the optical fiber 201 may be placed upon a non-planar table 208 and coupled to a measurement instrument 203 via a pair of fiber connects 219 and 221 attached to the ends of the optical fiber 201. Placing the optical fiber 201 upon the non-planar table 208 automatically produces, for example, three macrobends of equal radius R as depicted in FIG. 5, where the plane of the first macrobend 555 is orthogonal to the plane of the second macrobend 560. Further, the plane of the third macrobend 565 is orthogonal to the plane of the second macrobend 560 and parallel to the plane of the first macrobend 555. The first macrobend 555 and the third macrobend 565 comprise 90 degree turns of the optical fiber 201, while the second macrobend 560 comprises a 180 degree turn of the optical fiber 201. In this way, the optical fiber may be easily deployed for testing in accordance with established standards with minimal handling of the optical fiber, thereby reducing a number of microbends of the optical fiber which may otherwise be introduced by touching the optical fiber.

At 1210, method 1200 may include receiving a power output of the optical fiber, for example from the detector 220. At 1215, method 1200 may include calculating a cutoff wavelength of the optical fiber based on the measured power output of the optical fiber. In particular, calculating the cutoff wavelength of the optical fiber may comprise calculating a wavelength where a ratio of two measured values of the power output decreases below a threshold. Specifically, the cutoff wavelength may comprise the wavelength where a ratio of the total power output to the fundamental mode power decreases below 0.1 decibels, for example as illustrated by plot 910 in FIG. 9.

At 1220, method 1200 may include recording the calculated cutoff wavelength in memory, for example memory 233. At 1225, method 1200 may include displaying the cutoff wavelength to a user, for example via the display 234. Method 1200 may then end.

FIG. 13 shows a high-level flow chart illustrating an example method 1300 for testing an optical fiber according to an embodiment of the present disclosure. In particular, method 1300 relates to the calculation of a core diameter of an optical fiber, wherein the optical fiber is positioned in three spatial dimensions. Specifically, the optical fiber may be positioned, as a non-limiting example, as depicted in FIG. 5 such that the optical fiber includes three macrobends of equal radius R. Method 1300 may be carried out by the systems and components depicted in FIG. 2, however the method may be applied to other systems and components without departing from the scope of the present disclosure. As a non-limiting example, method 1300 may be stored as executable instructions in the non-transitory memory 233 and may be executed by the processor 232 of the computing device 230.

Method 1300 may begin at 1305. At 1305, method 1300 may include commanding a light source to emit a photon beam into an optical fiber. The optical fiber may be positioned with at least two bends including a first bend and a second bend, the plane of the first bend perpendicular to the plane of the second bend. For example, with regard to the system of FIG. 2, the optical fiber 201 may be placed upon a non-planar table 208 and coupled to a measurement instrument 203 via a pair of fiber connects 219 and 221 attached to the ends of the optical fiber 201. Placing the optical fiber 201 upon the non-planar table 208 automatically produces three macrobends of equal radius R as depicted in FIG. 5, where the plane of the first macrobend 555 is orthogonal to the plane of the second macrobend 560. Further, the plane of the third macrobend 565 is orthogonal to the plane of the second macrobend 560 and parallel to the plane of the first macrobend 555. The first macrobend 555 and the third macrobend 565 comprise 90 degree turns of the optical fiber 201, while the second macrobend 560 comprises a 180 degree turn of the optical fiber 201. In this way, the optical fiber may be easily deployed for testing in accordance with established standards with minimal handling of the optical fiber, thereby reducing a number of microbends of the optical fiber which may otherwise be introduced by touching the optical fiber. In some examples, additional macrobends in the optical fiber may be introduced by wrapping the optical fiber around, as a non-limiting example, a post such as post 605 in FIG. 6.

At 1310, method 1300 may include receiving a radiation output of the optical fiber. For example, a spatially-resolving detector 225 may detect an intensity output of the optical fiber. Spatially-resolving detector 225 may comprise, as non-limiting examples, a video camera, a mechanically-scanned pinhole detector, and so on.

At 1315, method 1300 may include calculating a core diameter of the optical fiber based on the radiation output of the optical fiber. For example, the core diameter of the optical fiber may be calculated by comparing an intensity measured at first location within the optical fiber to an intensity measured at a second location within the optical fiber. For example, as described herein above with regard to FIG. 10, the core diameter of the optical fiber may be based on a ratio of an intensity measured at the center of the core of the optical fiber to an intensity measured at the edge of the core.

At 1320, method 1300 may include recording the core diameter in memory, such as non-transitory memory 233. At 1325, method 1300 may include displaying the core diameter to a user, for example via a display 234. Method 1300 may then end.

In one embodiment, an apparatus for testing an optical fiber comprises: a light source enclosed within a housing and configured to couple to a first end of the optical fiber; a detector enclosed within the housing and configured to couple to a second end of the optical fiber; and a non-planar table defining a curved path, the non-planar table attached to the housing and configured to guide the optical fiber along the curved path in three dimensions. In one example, the curved path of the non-planar table comprises a horizontal plane, a vertical plane, and a curved transition between the horizontal plane and the vertical plane. The curved transition includes a radius of curvature, and the optical fiber guided along the curved path includes three bends with the radius of curvature. In one example, the vertical plane extends to a floor. In another example, the non-planar table includes a cylindrical post attached to a horizontal segment of the non-planar table.

In one example, the apparatus further comprises a monochromator optically coupled to the light source. In another example, the apparatus further comprises a chopper optically coupled to the light source. In yet another example, the apparatus further comprises a first lens optically coupled to the light source and a second lens optically coupled to the detector.

In another example, the apparatus further comprises a first fiber connector and a second fiber connector. The optical fiber is coupled to the apparatus via the first fiber connector and the second fiber connector. The first fiber connector and the second fiber connector are both aligned in parallel and horizontally with respect to gravity. The non-planar table has a continuous, integrated, and formed as one-piece, outer surface having a horizontal outer surface, a cylindrically curved outer surface forming the curved path, and vertical outer surface with only smooth unbroken transitions therebetween. In yet another example, the first fiber connector and the second fiber connector are positioned a specified distance apart to generate a bend of a desired radius of curvature in the optical fiber.

In another embodiment, a method of testing an optical fiber comprises: commanding a light source to emit a photon beam spanning a range of wavelengths into the optical fiber, the optical fiber positioned in three-dimensions with at least three bends of equal radius; receiving, from a sensor coupled to the optical fiber, a radiation output of the optical fiber; calculating a characteristic parameter of the optical fiber based on the radiation output of the optical fiber; and displaying the calculated characteristic parameter via a display.

In one example, the sensor comprises a spatially-integrating power law detector, and calculating the characteristic parameter comprises calculating a cutoff wavelength where a ratio of two measured values of the power output decreases below a threshold. In another example, the sensor comprises a spatially-resolved power law detector, and calculating the characteristic parameter comprises calculating a core diameter of the optical fiber based on a ratio of a first radiation output at a given radial position to a second radiation output at a center of a core of the optical fiber decreasing below a threshold.

In one example, the optical fiber is suspended under gravity. In yet another example, the optical fiber comprises a specified length.

In yet another embodiment, a system comprises: a measurement instrument enclosed within a housing, the measurement instrument comprising a light source and a detector; a non-planar table defining a curved path, the non-planar table attached to the housing; and a computing device comprising a processor and a non-transitory memory, the computing device configured with instructions in the non-transitory memory that when executed cause the processor to calculate a characteristic parameter of an optical fiber coupled to the measurement instrument and laid upon the non-planar table.

In one example, the measurement instrument further comprises one or more of a monochromator, a chopper, a launch optics, and a receive optics. In another example, the non-planar table comprises a horizontal segment, a vertical segment, and a curved segment connecting the horizontal segment and the vertical segment. In such an example, the non-planar table attaches to the housing via the horizontal segment. The curved segment comprises a specified radius of curvature.

In one example, the system further comprises a cylindrical post attached to the non-planar table. In another example, the system further comprises at least two fiber connectors configured to couple the optical fiber to the measurement instrument.

In another embodiment, a test method comprises positioning an optical fiber to have at least two bends, the first bend non-planer with the second bend such that a length of the fiber comprising the bends is not contained within a single plane. The method further comprises directing light through the optical fiber and determining a characteristic parameter of the optical fiber based on transmission of the light through the at least two bends, wherein the at least two bends are each of a specified radius, and wherein at least one of the bends is formed by gravity with the fiber being spaced away from all surfaces at the bend formed by gravity, but contiguous with a surface at at least one other bend, and wherein the length not contained within the single plane is greater than a thickness of the fiber.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

Note that in one example, the non-planar deployment of the fiber does not encompass the thickness of the fiber itself, in that the non-planar deployment includes the fiber being flexed into position through bends or radii that are larger than the thickness of the fiber itself such that a third dimension of positioning of the fiber exists outside of the of a planar surface and the thickness of the fiber.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for testing an optical fiber, comprising:
   a light source enclosed within a housing and configured to couple to a first end of the optical fiber;
   a detector enclosed within the housing and configured to couple to a second end of the optical fiber;
   a non-planar table defining a curved path, the non-planar table attached to the housing and configured to guide the optical fiber along the curved path along three dimensions; and
   a processor coupled to the detector wherein the processor is configured to calculate a characteristic parameter of the optical fiber.

2. The apparatus of claim 1, wherein the curved path of the non-planar table comprises a horizontal plane, a vertical plane, and a curved transition between the horizontal plane and the vertical plane.

3. The apparatus of claim 2, wherein the curved transition includes a radius of curvature, and wherein the optical fiber guided along the curved path includes at least three bends with approximately the radius of curvature.

4. The apparatus of claim 3, wherein the optical fiber has at least two lengths adjacent a middle curve positioned vertically with respect to gravity.

5. The apparatus of claim 1, wherein the non-planar table includes a cylindrical post attached to a horizontal segment of the non-planar table.

6. The apparatus of claim 1, further comprising a monochromator optically coupled to the light source.

7. The apparatus of claim 1, further comprising a first lens optically coupled to the light source and a second lens optically coupled to the detector.

8. The apparatus of claim 1, further comprising a first fiber connector and a second fiber connector both aligned in parallel and horizontally with respect to gravity, and wherein the optical fiber is coupled to the apparatus via the first fiber connector and the second fiber connector, and wherein the non-planar table has a continuous, integrated, and formed as one-piece, outer surface having a horizontal outer surface, a cylindrically curved outer surface forming the curved path, and a vertical outer surface with only smooth unbroken transitions therebetween.

9. The apparatus of claim 1, wherein the first fiber connector and the second fiber connector are positioned a specified distance apart to generate a bend of a desired radius of curvature in the optical fiber.

10. A method of testing an optical fiber, comprising:
    commanding a light source to emit a photon beam spanning a range of wavelengths into the optical fiber, the optical fiber positioned in three-dimensions with at least three bends of equal radius;
    receiving, from a sensor coupled to the optical fiber, a radiation output of the optical fiber;
    calculating a characteristic parameter of the optical fiber based on the radiation output of the optical fiber; and
    displaying the calculated characteristic parameter via a display.

11. The method of claim 10, wherein the sensor comprises a spatially-integrating detector, and wherein calculating the characteristic parameter comprises calculating a cutoff wavelength where a ratio of two measured values of the power output decreases below a threshold.

12. The method of claim 10, wherein the sensor comprises a spatially-resolved detector, and wherein calculating the characteristic parameter comprises calculating a core diameter of the optical fiber based on a ratio of a first radiation output at a given radial position to a second radiation output at a center of a core of the optical fiber decreasing below a threshold.

13. The method of claim 10, wherein the optical fiber is suspended under gravity.

14. A system, comprising:
    a measurement instrument enclosed within a housing, the measurement instrument comprising
    a light source and a detector;
    a non-planar table defining a curved path, the non-planar table attached to the housing; and
    a computing device comprising a processor and a non-transitory memory, the computing device configured with instructions in the non-transitory memory that when executed cause the processor to calculate a characteristic parameter of an optical fiber coupled to the measurement instrument and laid upon the non-planar table wherein the fiber is guided along a three dimensional curved path.

15. The system of claim 14, wherein the measurement instrument further comprises one or more of a monochromator, a chopper, a launch optics, and a receive optics.

16. The system of claim 14, wherein the non-planar table comprises a horizontal segment, a vertical segment, and a curved segment of a specified radius of curvature connecting the horizontal segment and the vertical segment, and wherein the non-planar table attaches to the housing via the horizontal segment.

17. The system of claim 14, further comprising a cylindrical post attached to the non-planar table.

18. The system of claim 14, further comprising at least two fiber connectors configured to couple the optical fiber to the measurement instrument.

19. A test method, comprising:
    positioning an optical fiber to have at least two bends including a first bend and a second bend, the first bend non-planer with the second bend such that a length of the optical fiber comprising the at least two bends is not contained within a single plane; and
    directing light through the optical fiber and determining a characteristic parameter of the optical fiber based on transmission of the light through the at least two bends, wherein the at least two bends are each of a specified radius, and wherein at least one of the bends is formed by gravity with the fiber being spaced away from all surfaces at the bend formed by gravity, but contiguous with a surface at at least one other bend, and wherein the length not contained within the single plane is greater than a thickness of the fiber.

* * * * *